United States Patent
Arnedo et al.

(10) Patent No.: US 9,998,031 B2
(45) Date of Patent: Jun. 12, 2018

(54) PWM CONTROLLED NEUTRAL POINT CLAMPED MULTILEVEL CONVERTER

(71) Applicant: Otis Elevator Company, Farmington, CT (US)

(72) Inventors: Luis Arnedo, Vernon, CT (US); Marinko Kovacic, Zagrebacka (HR); Yang Wang, Hartford, CT (US); Shashank Krishnamurthy, Rocky Hill, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days. days.

(21) Appl. No.: 15/689,509

(22) Filed: Aug. 29, 2017

(65) Prior Publication Data

US 2017/0359000 A1  Dec. 14, 2017

Related U.S. Application Data

(62) Division of application No. 14/646,465, filed as application No. PCT/US2012/066200 on Nov. 21, 2012, now Pat. No. 9,755,546.

(51) Int. Cl.
*H02M 7/487* (2007.01)
*H02M 7/537* (2006.01)

(52) U.S. Cl.
CPC ........... *H02M 7/537* (2013.01); *H02M 7/487* (2013.01)

(58) Field of Classification Search
CPC .................................................... H02M 7/487
See application file for complete search history.

(56) References Cited

U.S. PATENT DOCUMENTS

| 5,627,742 A | 5/1997 | Nakata et al. |
| 6,031,738 A | 2/2000 | Lipo et al. |

(Continued)

FOREIGN PATENT DOCUMENTS

| CN | 1079596 A | 12/1993 |
| EP | 0567082 A1 | 10/1993 |

(Continued)

OTHER PUBLICATIONS

Burgos, R. et al., "Space Vector Modulator for Vienna-Type Rectifiers Based on the Equivalence Betwee Two-and Three Level Converters: A Carrier Based Implementation" IEEE Transactions on Power Electronics, Institute of Electrical and Electronics Engineers, vol. 23, No. 4, Jul. 1, 2008, 11 pages.

(Continued)

*Primary Examiner* — Timothy J Dole
*Assistant Examiner* — Ishrat Jamali
(74) *Attorney, Agent, or Firm* — Cantor Colburn LLP

(57) ABSTRACT

A neutral point clamped, multilevel level converter includes a DC voltage link; a first capacitor coupling one side of the DC link to a neutral point; a second capacitor coupling another side of the DC link to the neutral point; a plurality of phase legs, each phase leg including switches, each phase leg coupled to an AC node; a current sensor associated with each AC node; and a controller generating a PWM signal to control the switches, the controller generating a current zero sequence component in response to current sensed at each of the current sensors, the controller adjusting a modulation index signal in response to the current zero sequence component to produce the PWM signal.

9 Claims, 4 Drawing Sheets

(56) References Cited

U.S. PATENT DOCUMENTS

| | | | |
|---|---|---|---|
| 6,337,804 B1 | 1/2002 | Kea et al. | |
| 7,061,134 B2* | 6/2006 | Hiti | H02M 7/5387 |
| | | | 290/44 |
| 8,441,820 B2 | 5/2013 | Shen et al. | |
| 2010/0044160 A1* | 2/2010 | Agirman | B66B 1/302 |
| | | | 187/290 |
| 2011/0141786 A1* | 6/2011 | Shen | H02M 7/487 |
| | | | 363/131 |
| 2015/0303826 A1 | 10/2015 | Arenedo | |

FOREIGN PATENT DOCUMENTS

| | | |
|---|---|---|
| EP | 2101402 A2 | 9/2009 |
| EP | 2383878 A2 | 11/2011 |
| JP | H08322261 A | 12/1996 |
| JP | 2011030380 A | 2/2011 |
| WO | 0231956 A1 | 4/2002 |

OTHER PUBLICATIONS

European Search Report for application EP 12888967.2, dated Aug. 8, 2016, 9 pages.
Notification of Transmittal of The International Search Report of The International Searching Authority; PCT/US2012/066200; dated May 15, 2013; 5 Pages.
Written Opinion of The International Searching Authority; PCT/US2012/066200; dated May 15, 2013; 5 Pages.
Youngdong Li , "A General SVM Algorithm for Multilevel Converters Considering Zero-Sequence Component Control", 005, IEEE Tsinghua University.

* cited by examiner

PWM CONTROLLED NEUTRAL POINT CLAMPED MULTILEVEL CONVERTER

CROSS-REFERENCE TO RELATED APPLICATIONS

This application is a divisional of U.S. patent application Ser. No. 14/646,465, filed May 21, 2015, which is a U.S. National Stage Application of PCT/US2012/066200, filed Nov. 21, 2012, and all the benefits accruing therefrom under 35 U.S.C. § 119, the contents of which in its entirety are herein incorporated by reference.

FIELD OF INVENTION

The subject matter disclosed herein relates generally to the field of power conversion systems, and more particularly, to a neutral point clamped multilevel converter.

DESCRIPTION OF RELATED ART

Neutral point clamped (NPC) multilevel converters are used to convert a DC signal to an AC signal and to convert an AC signal to a DC signal. One problem with neutral point clamped multilevel converters is neutral point (NP) voltage balancing. Correct operation of a three level NPC converter requires that the voltage across both dc-link capacitors be the same. This ensures that the voltage stress across each of the semiconductor devices is the same, uniformly spreading switching losses and improving reliability. The NP voltage balancing problem arises from the existence of a non-zero NP current.

Existing NP voltage balancing techniques, without additional apparatus, are based on common mode voltage injection, resulting in very uneven thermal stress among different power semiconductor devices within the NPC converter. This results in overrating the semiconductor devices and/or limiting the operating range of the converter in order to stay within the thermal constraints of all devices. The thermal stress of a power semiconductor device can be measured with its junction-to-case temperature rise ($\Delta T_{jc}$) under load. The maximum power throughput of a converter, as well as the expected lifetime of the devices, is limited by the highest $\Delta T_{jc}$, which is usually seen in the neutral diodes in the case of a three-level NPC converter.

Existing pulse width modulation (PWM) schemes attempt to address drawbacks of NPC multilevel converters. Existing PWM schemes attempt to minimize switching losses in the NPC converter. These schemes result in undesired neutral point current and a $\Delta T_{jc}$ that is uneven among devices, with the highest thermal stress on the neutral diodes. Other PWM techniques can be used to minimize the NP current. Although the NP current is minimized, the neutral diodes are still subject to substantially more thermal stress than other devices.

BRIEF SUMMARY

According to an exemplary embodiment of the invention, a neutral point clamped, multilevel level converter includes a DC voltage link; a first capacitor coupling one side of the DC link to a neutral point; a second capacitor coupling another side of the DC link to the neutral point; a plurality of phase legs, each phase leg including switches, each phase leg coupled to an AC node; a current sensor associated with each AC node; and a controller generating a PWM signal to control the switches, the controller generating a current zero sequence component in response to current sensed at each of the current sensors, the controller adjusting a modulation index signal in response to the current zero sequence component to produce the PWM signal.

According to another exemplary embodiment of the invention a neutral point clamped, multilevel level converter includes a DC voltage link; a first capacitor coupling one side of the DC link to a neutral point; a second capacitor coupling another side of the DC link to the neutral point; a plurality of phase legs, each phase leg including devices, the devices including clamping diodes and switches, each phase leg coupled to an AC node; and a controller generating a PWM signal to control the switches, the controller providing one of thermal balance across the devices and neutral point current balance in response to a thermal balance enable signal.

Other aspects, features, and techniques of embodiments of the invention will become more apparent from the following description taken in conjunction with the drawings.

BRIEF DESCRIPTION OF THE DRAWINGS

Referring now to the drawings wherein like elements are numbered alike in the FIGURES.

DETAILED DESCRIPTION

Figure 1:
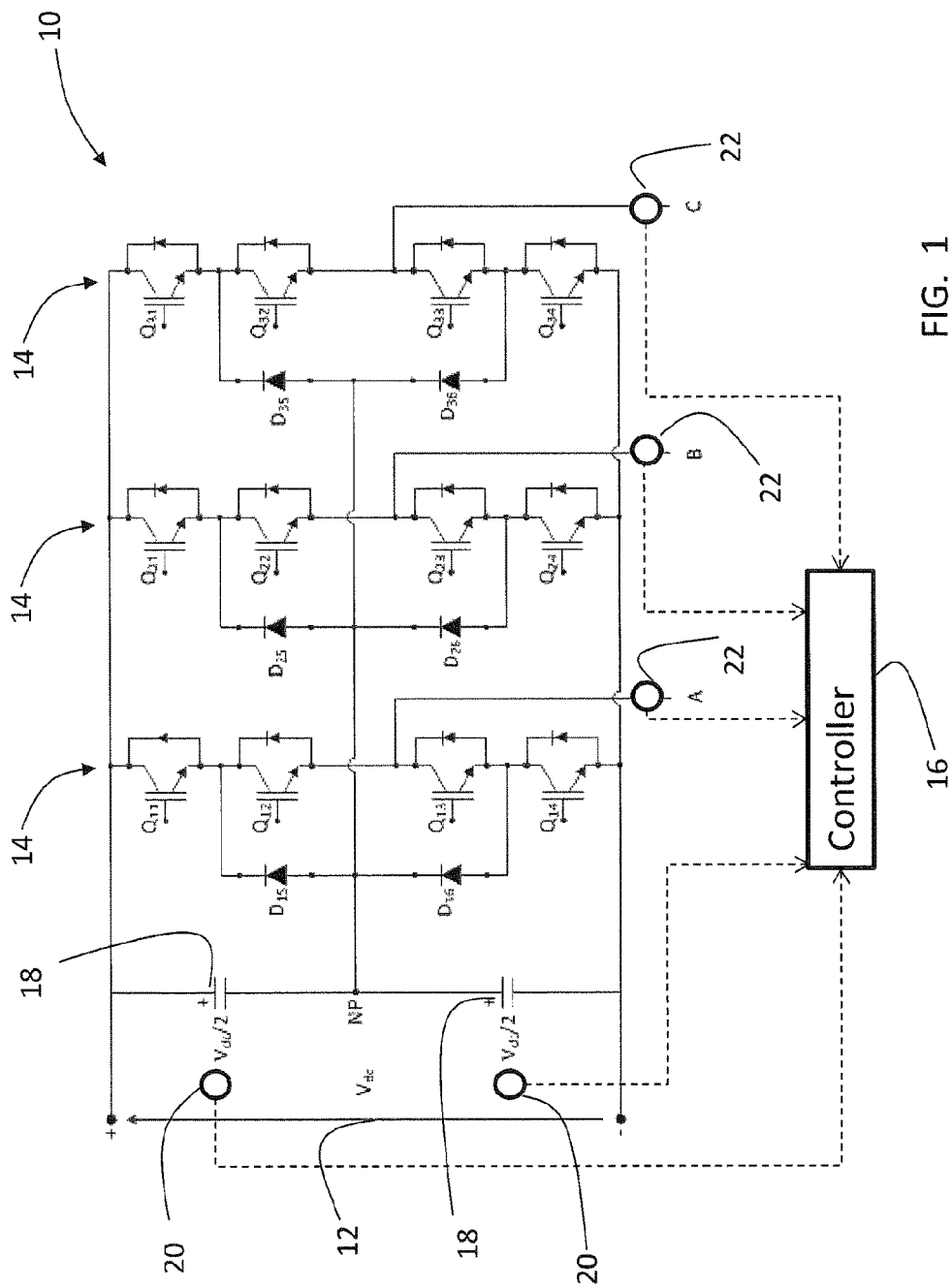
FIG. 1 is a schematic diagram of an NPC multilevel converter in an exemplary embodiment.

FIG. 1 is a schematic diagram of an NPC three phase, three level converter in an exemplary embodiment. The converter can operate in a generative mode or a regenerative mode. In generative mode, a DC signal from DC link 12 is converted to an AC signal. Two capacitors 18 are connected in series across the DC link 12, with the capacitor junction being referred to as the neutral point (NP). Converter 10 generates a single phase AC signal at each of AC nodes A, B and C. Each leg 14 of the converter 10 generates one of the AC phases. As known in the art, switches Q are controlled by a controller 16 to generate AC waveforms. Each leg 14 includes clamping neutral diodes, D, to clamp the leg output to a neutral point NP. In regenerative mode, an AC signal on one or more of AC nodes A, B and C is converted to a DC signal and supplied to DC link 12. In regenerative mode, switches Q are controlled by controller 16 to generate DC signal at DC link 12. Switches Q may be transistors as known in the art.

To reduce NP current, controller 16 generates at least one zero sequence component that is combined with a modulation index signal used to generate PWM signals for switches Q. Controller 16 monitors voltage over the capacitors 18 through voltage sensors 20. Controller 16 monitors current at each AC node through current sensors 22. The two voltage measurements and three current measurements are used to adjust the modulation index signal to reduce NP current.

Figure 2:
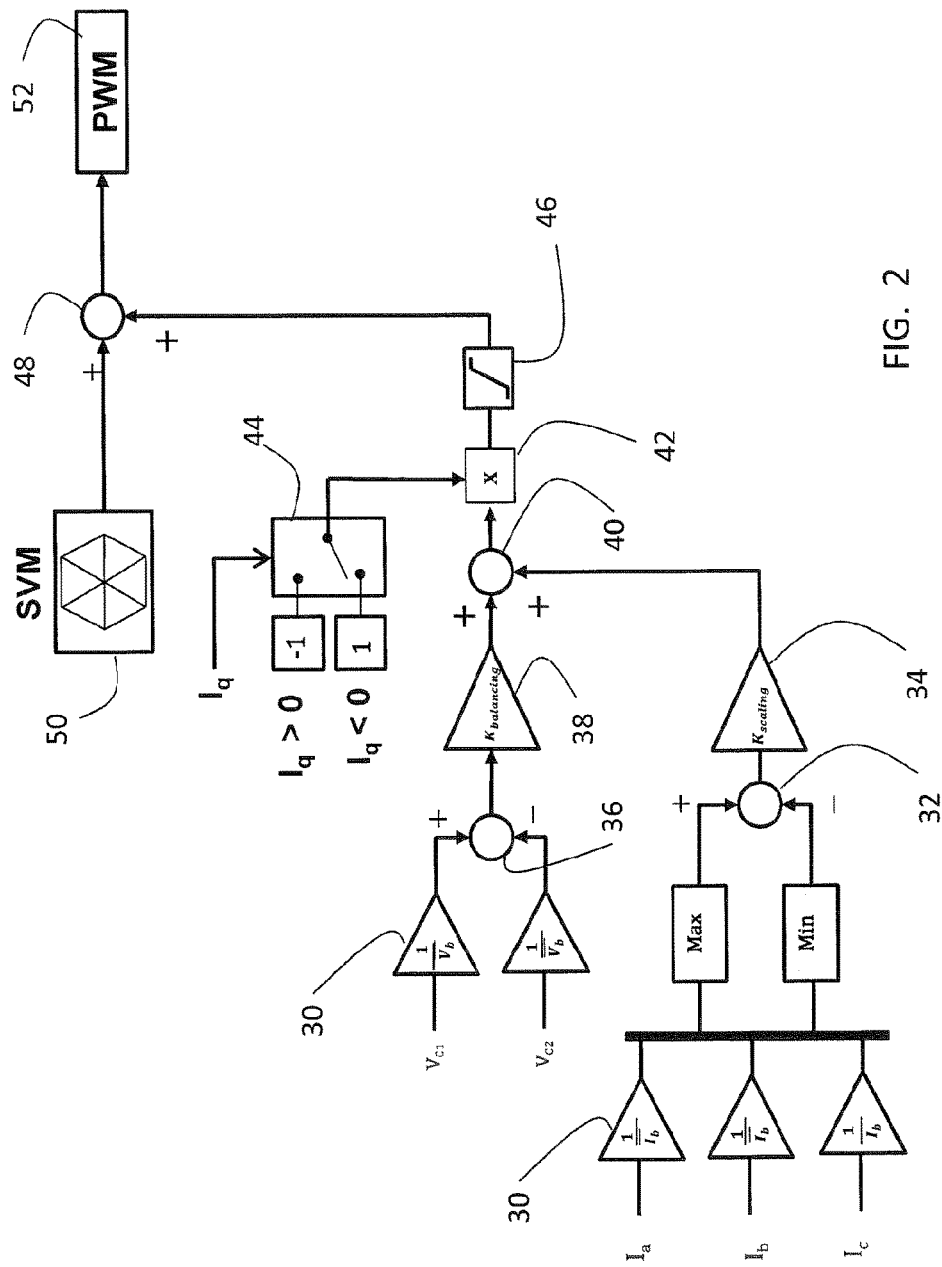
FIG. 2 depicts a PWM control process in an exemplary embodiment.

FIG. 2 depicts a PWM control process in an exemplary embodiment. The control process may be executed by controller 16. Controller 16 may be implemented using a general-purpose microprocessor executing a computer program stored on a storage medium to perform the operations described herein. Alternatively, controller 16 may be implemented in hardware (e.g., ASIC, FPGA) or in a combination of hardware/software.

As shown in FIG. 2, the current sensed at each AC node, Ia, Ib and Ic, is inverted at a respective inverter 30. The minimum inverted current is subtracted from the maximum inverted current at current combiner 32. The combined inverted current is scaled by a scaling factor, $K_{scaling}$, at current scaler 34. The output of current scaler 34 is a current zero sequence component.

The voltage sensed across each capacitor 18 is inverted at a respective inverter 30. The inverted voltages are subtracted at voltage combiner 36. The combined inverted voltage is scaled by a balancing factor, $K_{balancing}$, at voltage scaler 38. The output of voltage scaler 38 is a voltage zero sequence component.

The current zero sequence component and voltage zero sequence component are combined at combiner 40 to produce a combined zero sequence component. A multiplier 42 multiplies the combined zero sequence component by 1 or −1, depending on a direction of quadrature current, Iq. Selector 44 selects 1 if Iq is less than zero and selects −1 if Iq is greater than zero. In exemplary embodiments, Iq will be positive in generative mode and negative in regenerative mode.

The combined zero sequence component is amplified at amplifier 46. The output of amplifier 46 is provided to a combiner 48, where they combined zero sequence component is added to a modulation index signal from a space vector modulation (SVM) unit 50. The SVM unit 50 executes an algorithm to generate modulation index signals that are used by PWM unit 52 to control the duty cycle of PWM signals applied to switches Q. The combined zero sequence component is added to the modulation index signal prior to providing the modulation index signals to the PWM unit 52.

The process of FIG. 2 reduces NP current by creating two separate zero sequence components (i.e., a current zero sequence component and a voltage zero sequence component), that are added or subtracted from the modulation index signal dependent upon whether the converter 10 is working in the generative or regenerative mode.

Figure 3:
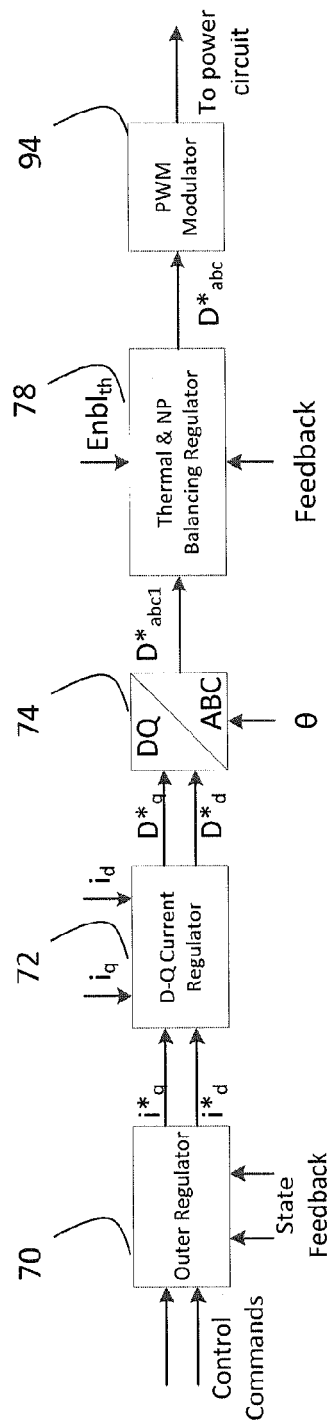
FIG. 3 depicts a PWM control process in another exemplary embodiment.

FIG. 3 depicts a control process in exemplary embodiments for providing thermal balance across switches and balancing NP current. The process of FIG. 3 may be implemented by controller 16. An outer regulator 70 receives control commands and state feedback signals to generate direct (D) and quadrature (Q) current commands, $i^*_d$ and $i^*_q$. The control commands may be real and reactive power, DC-link voltage, etc., from an external control system. The state feedback signals may be real and reactive power, DC-link voltage, etc.

The direct (D) and quadrature (Q) current commands, $i^*_d$ and $i^*_q$, are provided to direct-quadrature current regulator 72 which generates D-Q duty cycle commands based on the commanded direct current, $i^*_d$, commanded quadrature current, $i^*_q$, measured direct current, $i_d$, and measured quadrature current, $i_q$. Direct-quadrature current regulator 72 generates a commanded quadrature duty cycle, $D^*_q$, and a commanded direct duty cycle, $D^*_d$. A duty cycle transform 74 converts the commanded quadrature duty cycle, $D^*_q$, and commanded direct duty cycle, $D^*_d$, into a commanded three phase duty cycle $D^*_{abc1}$. Duty cycle transform 74 applies a DQ/ABC transformation as known in the art. The angle θ is the DQ/ABC rotational transformation angle.

Figure 4:
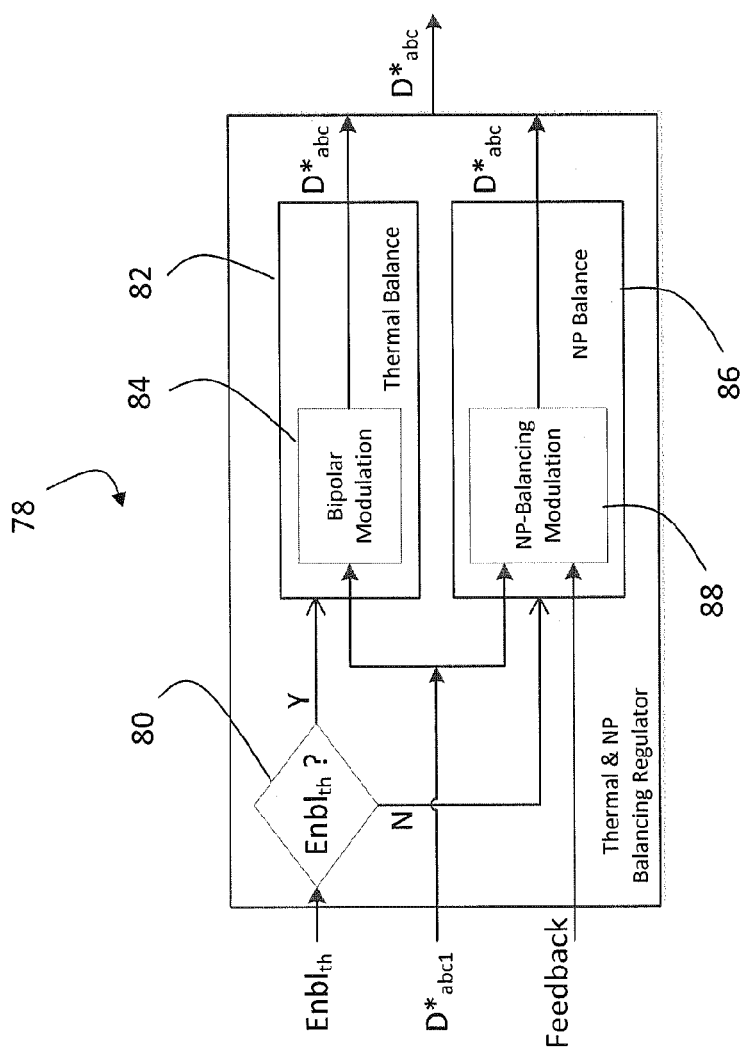
FIG. 4 depicts a balance regulator in an exemplary embodiment.

The commanded three phase duty cycle, $D^*_{abc1}$ is provided to a balance regulator 78. An exemplary balance regulator 78 is depicted in FIG. 4. Balance regulator 78 provides either thermal balance or NP current balance. A thermal balance enable signal, $ENBL_{th}$, is provided to the balance regulator 78. The thermal balance enable signal, $ENBL_{th}$, is used to select one of thermal balancing or NP current and voltage balancing. Feedback is provided to the balance regulator 78 as described in further detail with reference to FIG. 4. The output of balance regulator 78 is a balanced commanded three phase duty cycle, $D^*_{abc}$ provided to a PWM modulator 94.

FIG. 4 depicts a balance regulator 78 in an exemplary embodiment. Operation of the balance regulator 78 includes determining the state of the thermal balance enable signal, $ENBL_{th}$, at comparator 80. The thermal balance enable signal, $ENBL_{th}$, may set or reset for each PWM cycle based on the expected thermal stress of all the devices (i.e., diodes and switches). For instance, thermal balance enable signal, $ENBL_{th}$, is set when the expected $\Delta T_{jc}$ difference between the neutral diodes and other devices exceeds the preset threshold. The thermal balance enable signal, $ENBL_{th}$, it is reset when the $\Delta T_{jc}$ difference is acceptable. The thermal balance enable signal, $ENBL_{th}$, can be pre-programmed and/or determined dynamically based on the $D^*_{abc1}$ and feedback signals. For example, in traction applications such as elevators and escalators, where the driving cycle profiles are pre-defined in the controller software, the thermal balance enable signal, $ENBL_{th}$, can be pre-programmed to enhance the benefits from the thermal balancing algorithm.

If the thermal balance enable signal, $ENBL_{th}$, is active (i.e. set), then a thermal balance regulator 82 is used to generate a thermal balanced, commanded three phase duty cycle $D^*_{abc}$. Thermal balance regulator 82 uses a bipolar modulator 84 to apply a bipolar modulation function. In the bipolar modulation mode, the phase output voltage level resides mostly at the positive and negative rails of DC link 12, except for very small period at the NP during a dead-time. The dead-time is adopted to prevent shoot-through across the DC link 12 as well as to guarantee low dv/dt stress at the AC nodes, A, B, C. The bipolar modulation functions applied by bipolar modulator 84 to produce a thermal balanced, commanded three phase duty cycle $D^*_{abc}$ are shown in equation (1). In equation (1), upper arm refers to a pair of switches, Q, coupled between a positive DC voltage and an AC node and lower arm refers to a pair of switches, Q, coupled between a negative DC voltage and the AC node.

$$\begin{cases} D^*_z = -0.5[\max(D^*_{abc1}) + \min(D^*_{abc1})] \\ D^*_{abc} = \begin{cases} 0.5(D^*_{abc1} + D^*_z) + 0.5 & \text{for upper arm} \\ |0.5(D^*_{abc1} + D^*_z) - 0.5| & \text{for lower arm} \end{cases} \end{cases} \quad (1)$$

If the thermal balance enable signal, $ENBL_{th}$, is inactive (i.e. reset) at comparator 80, then NP balance regulator 86 is used to generate an NP balanced, commanded three phase duty cycle $D^*_{abc}$. Neutral point balance regulator 86 includes an NP bipolar modulator 88 that receives the commanded three phase duty cycle, $D^*_{abc1}$, and system feedback. The feedback includes various operating information of the converter depending on the type of NP-balancing algorithm implemented. One exemplary NP-balancing algorithm is that shown in FIG. 2. In that case, the feedback includes the three-phase currents, Q-axis component of the current, and upper and lower DC bus voltages. Embodiments are not limited to the NP-balancing operations shown in FIG. 2, and the other NP-balancing operations may be implemented by the NP balance regulator 86. The output of the neutral point balance regulator 86 is a neutral point balanced, commanded three phase duty cycle, $D^*_{abc}$.

Referring back to FIG. 3, either the thermal balanced, commanded three phase duty cycle, $D^*_{abc}$, or the NP balanced, commanded three phase duty cycle, $D^*_{abc}$, is provided to a PWM modulator 94 to generate PWM signals to drive the converter 10.

Balance regulator 78 controls both the NP current and NP voltage allowing the DC-link capacitance values to be reduced. Additionally, balance regulator 78 distributes thermal stress more evenly among all devices (i.e., diodes D and switches Q), which translates into an increase in converter power throughput and/or an increase in expected device lifetime. These benefits are achieved without using higher rated devices or adding extra circuit components, with minimal additional computational power.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as being limited by the foregoing description, but is only limited by the scope of the appended claims.

The invention claimed is:

1. A neutral point clamped, multilevel level converter, comprising:
   a DC voltage link;
   a first capacitor coupling one side of the DC link to a neutral point;
   a second capacitor coupling another side of the DC link to the neutral point;
   a plurality of phase legs, each phase leg including devices, the devices including clamping diodes and switches, each phase leg coupled to an AC node; and
   a controller generating a PWM signal to control the switches, the controller providing one of thermal balance across the devices and neutral point current balance in response to a thermal balance enable signal.

2. The neutral point clamped, multilevel level converter of claim 1, wherein:
   the controller includes a thermal balance regulator, the thermal balance regulator generating a thermal balanced, commanded three phase duty cycle in response to the thermal balance signal being active.

3. The neutral point clamped, multilevel level converter of claim 2, wherein:
   thermal balance regulator includes a bipolar modulator to produce the thermal balanced, commanded three phase duty cycle.

4. The neutral point clamped, multilevel level converter of claim 3, wherein:
   the bipolar modulator applies a bipolar modulation function of $$\begin{cases} D^*_z = -0.5[\max(D^*_{abc1}) + \min(D^*_{abc1})] \\ D^*_{abc} = \begin{cases} 0.5(D^*_{abc1} + D^*_z) + 0.5 & \text{for upper arm} \\ |0.5(D^*_{abc1} + D^*_z) - 0.5| & \text{for lower arm} \end{cases} \end{cases}$$

where $D^*abc1$ is a commanded three phase duty cycle and $D^*abc$ is the thermal balanced, commanded three phase duty cycle.

5. The neutral point clamped, multilevel level converter of claim 1, wherein:
   the controller includes a neutral point balance regulator, the neutral point balance regulator generating a neutral point balanced, commanded three phase duty cycle in response to the thermal balance signal being inactive.

6. The neutral point clamped, multilevel level converter of claim 5, wherein:
   the neutral point balance regulator includes a neutral point balance modulator to produce the neutral point balanced, commanded three phase duty cycle.

7. The neutral point clamped, multilevel level converter of claim 6, wherein:
   the neutral point balance modulator generates the neutral point balanced, commanded three phase duty cycle in response to a commanded three phase duty cycle.

8. The neutral point clamped, multilevel level converter of claim 6, wherein:
   the neutral point balance modulator generates the neutral point balanced, commanded three phase duty cycle in response to a converter feedback.

9. The neutral point clamped, multilevel level converter of claim 8, wherein:
   the converter feedback includes DC voltages over the DC link.

\* \* \* \* \*